United States Patent [19]

Davis et al.

[11] Patent Number: 4,888,786

[45] Date of Patent: Dec. 19, 1989

[54] LASER GAS COMPOSITION CONTROL ARRANGEMENT AND METHOD

[75] Inventors: Jack W. Davis, East Hartford; Clyde O. Brown, New Britain, both of Conn.

[73] Assignee: United Technologies Corporation, Hartford, Conn.

[21] Appl. No.: 191,927

[22] Filed: May 9, 1988

[51] Int. Cl.⁴ .............................................. H11S 3/22
[52] U.S. Cl. ......................................... 372/58; 372/60
[58] Field of Search ....................... 372/55, 58, 59, 60

[56] References Cited

U.S. PATENT DOCUMENTS

| | | | |
|---|---|---|---|
| 3,611,186 | 10/1971 | Witleman | 372/55 |
| 3,789,320 | 1/1974 | Hepburn | 372/58 |
| 3,982,200 | 9/1976 | Hoag et al. | 372/55 |
| 3,982,205 | 9/1976 | Sutton et al. | 372/58 |
| 4,188,592 | 2/1980 | Buczek et al. | 372/59 |
| 4,283,686 | 8/1981 | Daugherty et al. | 372/58 |
| 4,316,157 | 2/1982 | Dosi et al. | 372/60 |
| 4,393,506 | 7/1983 | Laakmann et al. | 372/59 |
| 4,429,392 | 1/1984 | Yoshida et al. | 372/58 |
| 4,514,698 | 4/1985 | Blumenthal et al. | 372/59 |
| 4,610,014 | 9/1986 | Martinen et al. | 372/59 |
| 4,651,324 | 3/1987 | Prein et al. | 372/60 |

Primary Examiner—Frank Gonzalez
Attorney, Agent, or Firm—Peter R. Ruzek

[57] ABSTRACT

A $CO_2$ gas laser is equipped with a gas mixture control arrangement which introduces into the interior of the laser, of the constituent component of water, only hydrogen, in such amounts based on the instantaneous humidity of the gas mixture that the dew point of water vapor resulting from the combination of the thus introduced hydrogen with incidental oxygen present in the laser interior as an incident to the operation of the laser is maintained within a predetermined range.

13 Claims, 1 Drawing Sheet

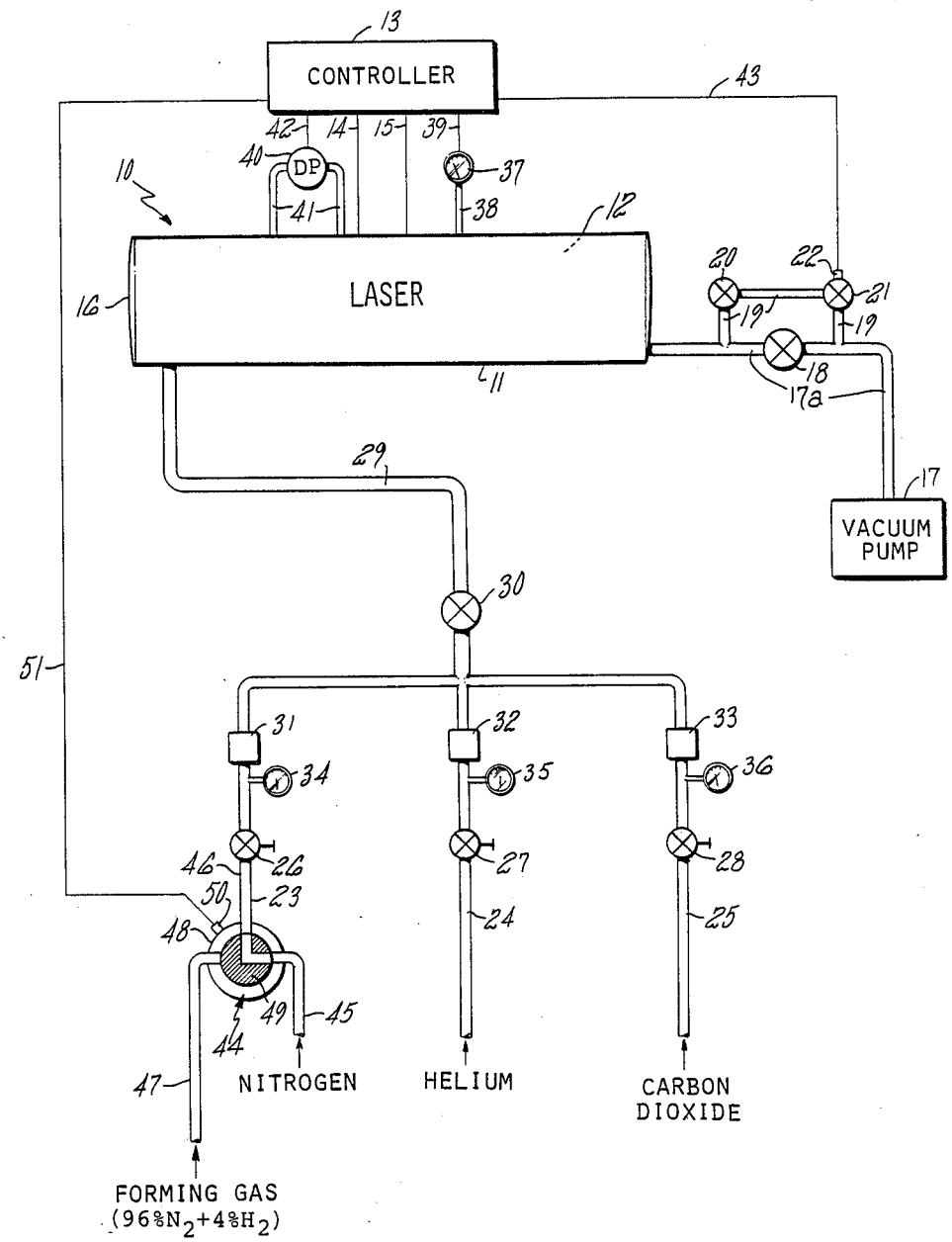

LASER GAS COMPOSITION CONTROL ARRANGEMENT AND METHOD

TECHNICAL FIELD

The present invention relates to gas lasers in general, and more particularly to industrial $CO_2$ lasers, such as those used in welding applications and the like.

BACKGROUND ART

There are already known various constructions of gas lasers, among them so-called industrial $CO_2$ lasers which use a pure direct current transverse discharge maintained in a flowing gas stream of nitrogen, helium, and carbon dioxide at a subatmospheric pressure of, for instance, 0.1 atmosphere gauge.

It has been established that, in lasers of the above-mentioned type, both the laser efficiency and the discharge stability are sensitive to the concentration of water vapor in the gas mixture. This is so because, on the one hand, water vapor enhances the depopulation of the upper laser level of $CO_2$ and, consequently, an increase in the water vapor amount in the gas mixture, that is, in the dew point of such water vapor, results in a decrease, albeit possibly quite small and yet not negligible, in the laser efficiency. On the other hand, however, experience has shown that the stability of the discharge decreases considerably with decreasing dew point.

Especially in low pressure (less than one atmosphere) laser systems with good vacuum integrity, prolonged running dries out the system, so that the laser efficiency increases as the dew point decreases, until a point is reached where the discharge stability, which deteriorates as the dew point decreases, becomes a major cause for concern. Therefore, it is customary or even mandatory when operating in the operating gas pressure range of, for example, 70 to 100 torr, which is typical for at least some constructions of industrial $CO_2$ lasers, to keep the dew point in a predetermined range in order to maintain a stable discharge with good laser efficiency.

In current practice, the dew point is usually maintained in a specified range by initially allowing the laser to dry out and then adding a small amount of water to the gas mixture to keep the dew point, as measured by a hygrometer, above a specified value. Typically, the water addition is accomplished by means of water droplet injection using a manual technique or automatically through a fast-acting valve, or by moist gas introduction via a bubbler system. These methods work quite effectively, but they are susceptible to failures which may result in a situation where excessive water is sucked into the laser system. In addition, the water-drop injection often causes a noticeable fluctuation in discharge stability and subsequently in the laser output power just after injection occurs. Furthermore, the rate of electrode corrosion or oxidation in industrial $CO_2$ lasers with water vapor addition can be relatively high.

It has also been proposed to introduce the water vapor needed in the laser cavity not as such, but rather in the form of its constituent components, that is, hydrogen and oxygen, in the proper stoichiometric ratio. While this approach has alleviated or eliminated some of the problems mentioned above, it has not avoided the problem of electrode oxidation; as a matter of fact, in many instances it has even aggravated this problem.

Accordingly, it is a general object of the present invention to avoid the disadvantages of the prior art.

More particularly, it is an object of the present invention to provide a $CO_2$ laser which does not possess the disadvantages of the known lasers of this kind.

Still another object of the present invention is to develop an arrangement for controlling the composition of the gas mixture flowing in the industrial laser of the type here under consideration in such a manner as to avoid the disadvantageous consequences stemming from the use of the heretofore known arrangements of this type.

It is yet another object of the present invention to devise a controlling arrangement of the above type, which renders it possible to accurately and predictably maintain the dew point of water vapor in the gaseous medium used by the aforementioned laser within a required range, without abrupt fluctuations which could adversely influence the laser performance.

A further object of the present invention is to design the controlling arrangement of the above type in such a manner as to be relatively simple in construction, inexpensive to manufacture, easy to use, and yet reliable in operation.

A concomitant object of the present invention is to present a method of controlling the composition of the gas mixture flowing through the interior of an industrial laser, which method is particularly suited for use in the controlling arrangement of the above type.

DISCLOSURE OF THE INVENTION

In keeping with these objects and others which will become apparent hereafter, one feature of the present invention resides in an arrangement for controlling the composition of a gas mixture flowing in the interior of a $CO_2$ laser, wherein the controlling arrangement introduces into the interior of the laser, of the constituent components of water, only hydrogen. Upon its introduction into the interior of the laser, this hydrogen then reacts with oxygen that is contained in the gas mixture present in the interior of the laser as an incident to the operation of the laser, thus forming the needed water vapor and simultaneously tying up the incidental oxygen present in the interior of the laser with attendant reduction in or elimination of the availability of such oxygen for oxidizing the electrodes. The present invention is also directed to a method of controlling the composition of the gas mixture, which involves the introduction of only hydrogen but no molecular oxygen into the interior of the laser, with the aforementioned advantageous results.

BRIEF DESCRIPTION OF THE DRAWING

The present invention will be described in more detail below with reference to the accompanying sole FIGURE of the drawing which is a simplified diagrammatic view of a $CO_2$ industrial laser equipped with the controlling arrangement of the present invention.

BEST MODE FOR CARRYING OUT THE INVENTION

Referring now to the sole FIGURE of the drawing in detail, it may be seen that the reference numeral 10 has been used therein to identify a gas laser which is shown only in a diagrammatic fashion because it is of a conventional construction well known to those active in the gas laser field. The laser 10 includes a laser housing 11 which bounds an internal space 12. The internal space or interior 12 of the laser 10 accommodates well-known laser components, such as electrodes which are located at mutually opposite sides of an elongated laser cavity through which a gas mixture consisting essentially of nitrogen, helium and carbon dioxide and including water vapor is caused to flow through the laser cavity, in a manner that is well known and hence need be neither illustrated nor described in detail here.

The aforementioned electrodes are supplied with electric power from or in a manner controlled by a controller 13, as indicated by electric lines 14 and 15. In this manner, there is generated an electric excitation field across the laser cavity and thus also across the flow of the gas mixture through the laser cavity. This excitation field causes the excitation of the gas mixture present in the laser cavity, causing it to emit light of a predetermined wavelength or frequency, and the so emitted light is brought into phase and direction of travel coincidence by using well-known optical components, to form a laser beam which then issues from one end of the laser 10, such as through an end face 16. This laser beam can then be used for various purposes, such as for welding in the case of an industrial $CO_2$ laser with which the present invention is particularly concerned.

Prior to commencing the operation of the laser 10, the interior 12 of the laser 10 must be evacuated not only to bring the pressure of the gas contained in the interior 12 to the desired relatively low absolute or gauge pressure, but also to remove the ambient atmosphere from the interior 12 for replacement by the required gas mixture. The evacuation is accomplished by means of a vacuum pump 17 which is connected with the interior 12 of the laser 10 by means of an evacuation conduit 17a which has a shutoff valve 18 incorporated therein. In the particular construction of the gas laser arrangement that is illustrated in the drawing, the vacuum pump 17 is also to be used for evacuating the interior 12 of the laser 10 and maintaining the pressure in the interior in the desired range during the laser operation. To this end, there is provided a bypass conduit 19 which bypasses the section of the evacuation conduit 17a that has the shutoff valve 18 incorporated therein. The bypass conduit 19 has a throttling valve 20 and a purge valve 21 incorporated therein. The operation of the purge valve 21 is controlled by a purge valve actuator 22.

After the initial evacuation of the interior 12 of the laser 10, the ambient atmosphere which was present in the interior 12 prior to and during the initial evacuation has to be purged or replaced by the lasing gas mixture initially. The lasing gas mixture essentially consists of nitrogen, helium and carbon dioxide in proportions that are well known to those skilled in this field, but it also contains water vapor. The nitrogen, helium and carbon dioxide constituent gases are supplied into the interior 12 of the laser 10 through respective separate conduits 23, 24 and 25 which have respective control valves 26, 27 and 28 incorporated therein and which merge into a common introducing conduit 29 which includes a main valve 30 and which communicates with the interior 12 of the laser 10. The separate conduits 26, 27 and 28 further include respective metering orifice devices 31, 32 and 33, and pressure gauges or sensors 34, 35, and 36 are connected to the separate conduits 23, 24 and 25 upstream of the metering orifice devices 31, 32 and 33 and measure the pressure of the nitrogen, helium and carbon dioxide gases at the corresponding locations. The information obtained from the pressure gauges 34, 35 and 36 may be supplied, in a manner that has not been shown in the drawing in order not to unduly encumber the same, to the controller 13 for evaluation.

The instantaneous pressure in the interior 12 of the laser 10 is being measured by another pressure gauge or transducer 37 that is connected to the laser interior 12 by a measuring conduit 38 and which provides a signal that is supplied to the controller 13 via a measuring line 39. On the other hand, a dew point measuring device or hygrometer 40, which is connected to the interior 12 of the laser 10 by another measuring conduit 41, measures the dew point or absolute humidity of the gas mixture contained in the interior 12, and the information derived therefrom is supplied via another measuring line 42 to the controller 13 for evaluation. The controller 13 controls the operation of the purge valve actuator 22 and thus of the purge valve 21 via a control line 43 on the basis of at least the information obtained from the pressure gauge 37, so as to maintain the pressure in the interior 12 in a predetermined pressure range. The construction and operation of the laser arrangement as described so far, inclusive of the controller 13, are well known, so that no further elaboration thereon is believed to be necessary.

As mentioned before, the humidity or water vapor dew point of the gas mixture present in the interior 12 of the laser 10 must be maintained within a predetermined range. In accordance with the present invention, this is accomplished by introducing into the interior 12 of the laser 10, of the constituent components of water, that is oxygen and hydrogen, only hydrogen, which then combines in the interior 12 of the laser 10 with incidental oxygen which is present in the interior 12 as an incident to the operation of the laser 10. Such incidental oxygen may be present in the gas mixture as a result of relatively small and yet unavoidable leakage of ambient atmosphere into the interior 12, or of liberation of oxygen atoms from the carbon dioxide in the laser cavity, or the like.

The hydrogen is supplied, in accordance with a currently preferred embodiment of the present invention, in the form of a forming gas which is a non-flammable mixture containing at most 4% of hydrogen, with the remainder being constituted by nitrogen. As shown in the drawing, the forming gas is introduced into the interior 12 of the laser 10 through a switching valve 44 which is interposed between an upstream portion 45 and a downstream portion 46 of the supply or replenishment conduit 23 for nitrogen. As illustrated, the forming gas is fed to the switching valve 44 through a forming gas feeding conduit 47. The switching valve 44 as illustrated includes a housing 48 and a valve member 49 which is accommodated in the housing 48 and is movable between two positions in one of which it connects only the upstream and downstream portions 45 and 46 of the nitrogen supply conduit 23 with one another, as shown, and in the other of which positions it connects exclusively the forming gas feeding conduit 47 with the downstream portion 46 of the conduit 23. The instantaneous position of the valve member 49 or, in other words, the switching state of the switching valve 44 is determined by a switching valve actuator 50 which is capable of moving the valve member 49 rapidly between its aforementioned two positions. The switching valve actuator 50 is, in turn, controlled by a signal supplied thereto from the controller 13 via a control line 51. This signal is issued by the controller 13 in accordance with well-known principles on the basis of the actual absolute humidity as measured by the hygrometer 40.

Thus, it may be seen that the present invention provides an arrangement for controlling the dew point and gas composition in gas lasers, in particular $CO_2$ lasers, to enhance discharge stability, to maintain high efficiency, and to reduce electrode oxidation problems. In addition, this invention provides smooth control of the gas composition so that the laser operation and thus the laser output power is not perturbed by the control process. An important point of this invention is the control of the dew point by adding hydrogen via non-explosive forming gas, which is constituted by a mixture of nitrogen and hydrogen with 4% or less of hydrogen.

In the industrial laser arrangement of the type disclosed here, the interior 12 of the laser 10 is purged continuously with the three laser gases ($N_2$, He and $CO_2$) The forming gas is introduced into the nitrogen metering system via the two-way switching valve 44. When the measured dew point drops below the set point, the two-way valve 44, which may have a construction different from that illustrated, switches to meter the forming gas rather than nitrogen into the system. Typical forming-gas injection time is about 10 seconds per minute of operation until the set point is reached.

The actual set point is based on the gas flow velocity. For example, with a velocity of 90 meters/sec, the dew point is typically maintained in a range of $-45°$ to $-50°$ C., but with a flow of 180 meters/second the optimum dew point may decrease to the $-55°$ to $-60°$ C. range, for instance. In any event, the respective range has a lower limit at a predetermined level above that corresponding to zero humidity.

This control system has the following advantages over the currently used techniques: First of all, the proposed all-gas system eliminates the possibility of flooding and alleviates orifice clogging problems. Secondly, the introduction of only hydrogen without introduction of corresponding stoichiometric amounts of oxygen reduces the rate of oxide build-up on electrodes by reducing the concentration of free oxygen/ozone in the discharge. Furthermore, the present invention employs a non-explosive method of introducing hydrogen. Also, the inventive approach results in a controlled slow change in the dew point to prevent power fluctuations.

The reduction in the electrode oxidation rate has proven to be a major benefit, especially in lasers that are run at high discharge power levels. In one industrial production application, the use of a forming gas injection system rather than water injection has extended the time between cleaning (oxide removal from) electrodes from 200 hours to over 800 hours.

While the present invention has been illustrated and described as embodied in a particular construction of a gas laser arrangement, it will be appreciated that the present invention is not limited to this particular example; rather, the scope of protection of the present invention is to be determined solely from the attached claims.

We claim:

1. An arrangement for controlling a composition of a laser gas mixture flowing through the interior of a $CO_2$ laser and initially including at least nitrogen, helium and carbon dioxide constituent gases, comprising means for measuring the humidity of the laser gas mixture present in the interior of the laser;

means for introducing into the interior of the laser, of the constituent components of water, only hydrogen for reacting with oxygen present in the gas mixture as an incident to the operation of the laser; and means for so controlling said introducing means during the operation of the laser in dependence on the humidity as measured by said measuring means as to maintain the dew point of the water vapor contained in the gas mixture within a predetermined range having a lower limit at a predetermined level above that corresponding to zero humidity.

2. The arrangement as defined in claim 1, wherein said introducing means includes means for admitting into the interior of the laser a gas containing at most 4% of hydrogen.

3. The arrangement as defined in claim 2, wherein said admitting means includes means for storing the hydrogen in the form of a non-explosive mixture with nitrogen constituting the remainder of said gas.

4. The arrangement as defined in claim 1, and further comprising means for replenishing the laser gas mixture present in the interior of the laser with a number of gaseous media each including at least one of the constituent gases and each substantially devoid of molecular oxygen.

5. The arrangement as defined in claim 4, wherein said replenishing means includes a separate conduit for each of said gaseous media; and wherein said controlling means includes a control valve interposed between an upstream portion and a downstream portion of one of said conduits for one of said gaseous media and between said one conduit and said introducing means for selectively controlling respective amounts of the one gaseous medium and of hydrogen flowing into said downstream portion of said one conduit from said upstream portion and from said introducing means, respectively, and means for actuating said control valve in dependence on the humidity of the gas mixture as measured by said measuring means.

6. The arrangement as defined in claim 5, wherein said upstream portion of said one conduit carries pure nitrogen as said one gaseous medium; and wherein said introducing means carries a forming gas containing at most 4% of hydrogen with the remainder being substantially pure nitrogen.

7. The arrangement as defined in claim 6, wherein said control valve is capable of assuming two states in one of which it establishes communication only between said upstream and downstream portions of said one conduit and in the other of which it establishes communication only between said introducing means and said downstream portion of said one conduit; and wherein said actuating means is operative for switching said control valve between said two states thereof.

8. A method of controlling a composition of a laser gas mixture flowing through the interior of a $CO_2$ laser and initially including at least nitrogen, helium and carbon dioxide constituent gases, comprising the steps of measuring the humidity of the gas mixture present in the interior of the laser;

introducing into the interior of the laser, of the constituent components of water, only hydrogen for reacting with oxygen present in the gas mixture as an incident to the operation of the laser; and controlling said introducing step during the operation of the laser in dependence on the humidity as measured in said measuring step in such a manner as to maintain the dew point of the water vapor contained in the gas mixture within a predetermined range having a lower limit at a predetermined level above that corresponding to zero humidity.

9. The method as defined in claim 8, wherein said introducing step includes admitting into the interior of the laser a forming gas containing at most 4% of hydrogen.

10. The method as defined in claim 9, wherein said admitting step includes storing the hydrogen in the form of a non-explosive mixture with nitrogen constituting the remainder of the forming gas.

11. The method as defined in claim 8, and further comprising the step of replenishing the laser gas mixture present in the interior of the laser with a number of gaseous media each including at least one of the constituent gases and each substantially devoid of molecular oxygen. predetermined level above that corresponding to zero humidity.

12. The method as defined in claim 11, wherein said replenishing step includes separately conducting each of the gaseous media; and wherein said controlling step includes controlledly temporarily replacing one of the gaseous media by a forming gas containing the requisite quantity of hydrogen.

13. The method as defined in claim 12, wherein said one gaseous medium is substantially pure nitrogen and said forming gas contains at most 4% of hydrogen with the remainder being substantially pure nitrogen.

* * * * *